UNITED STATES PATENT OFFICE.

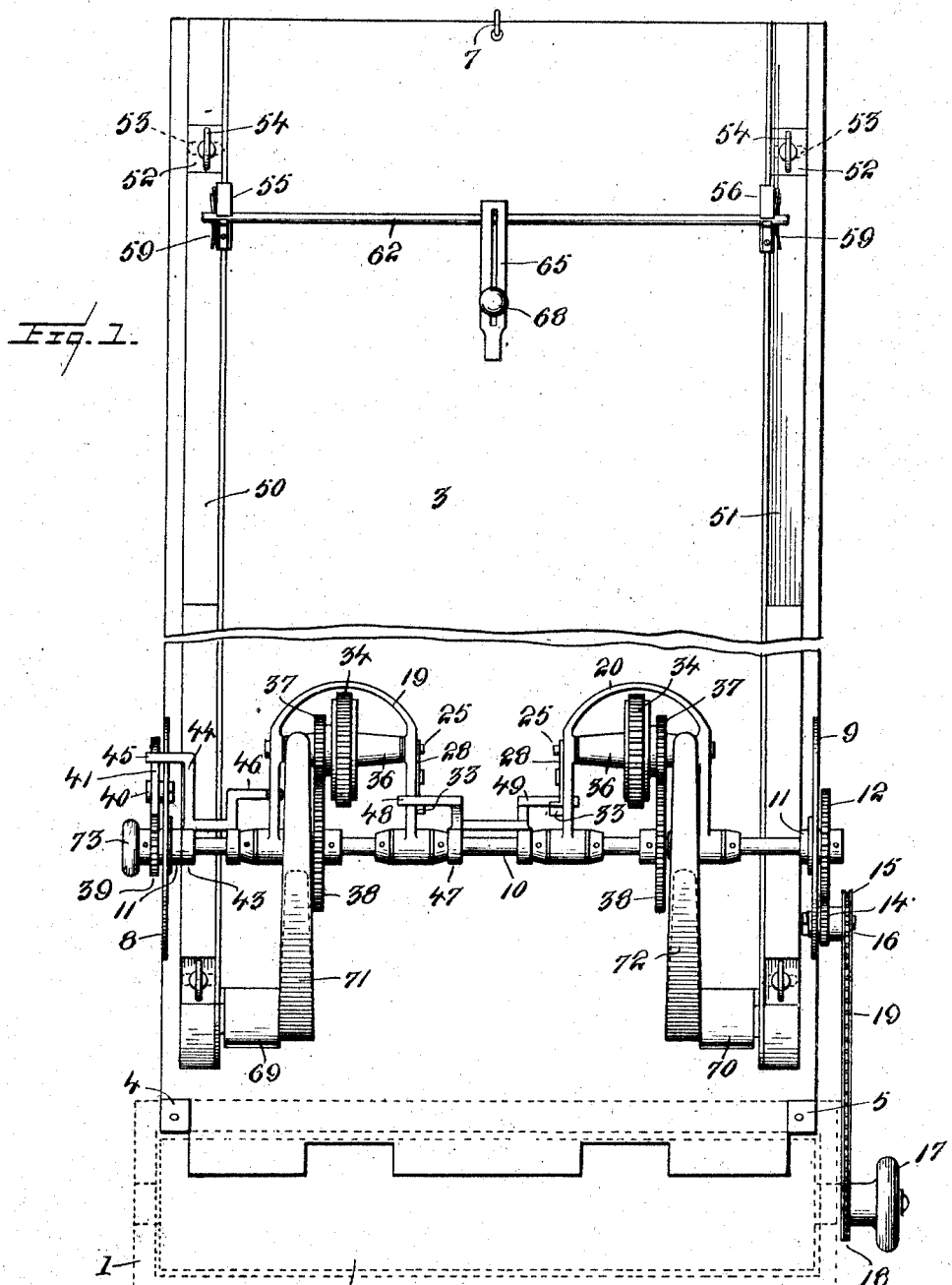

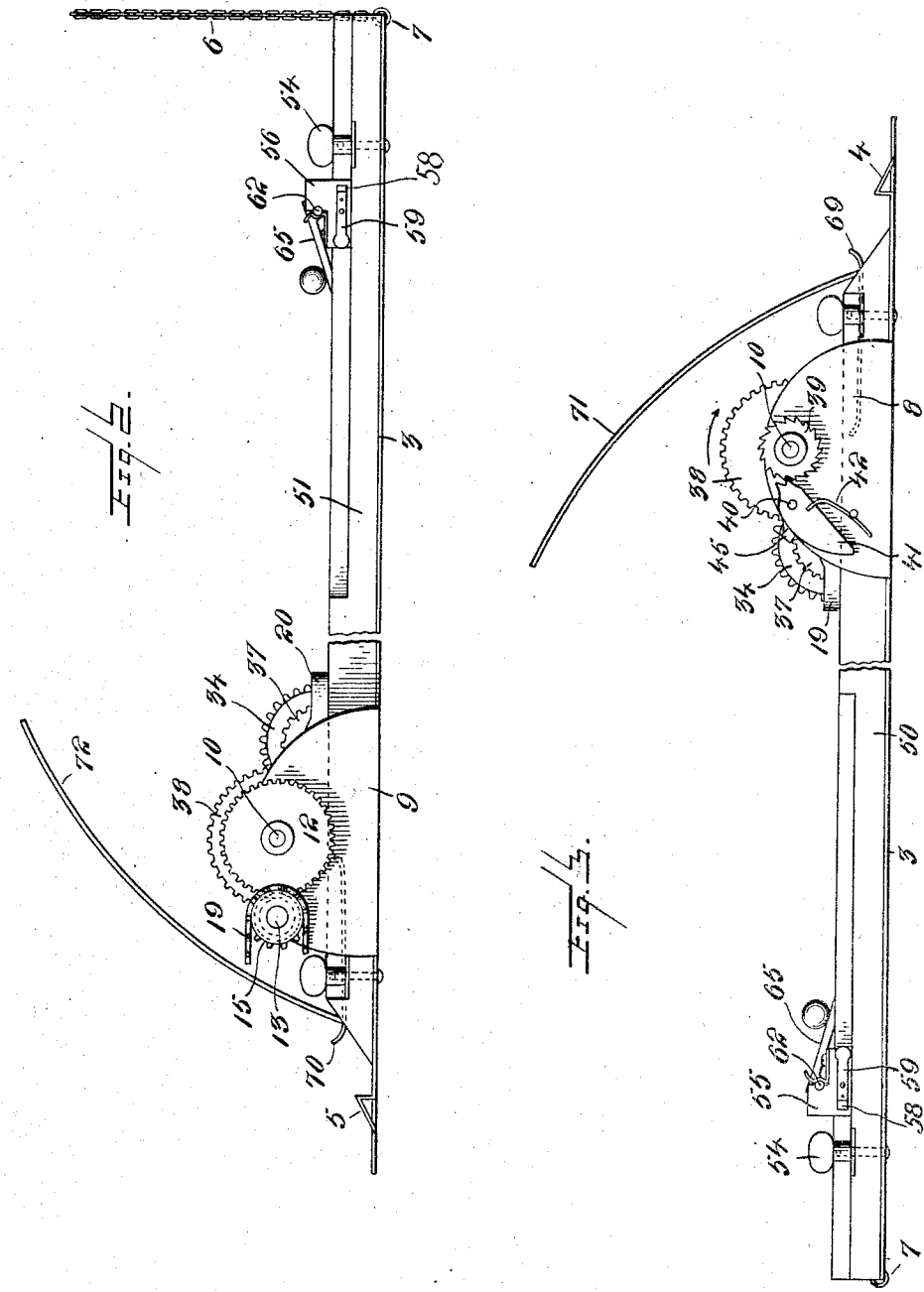

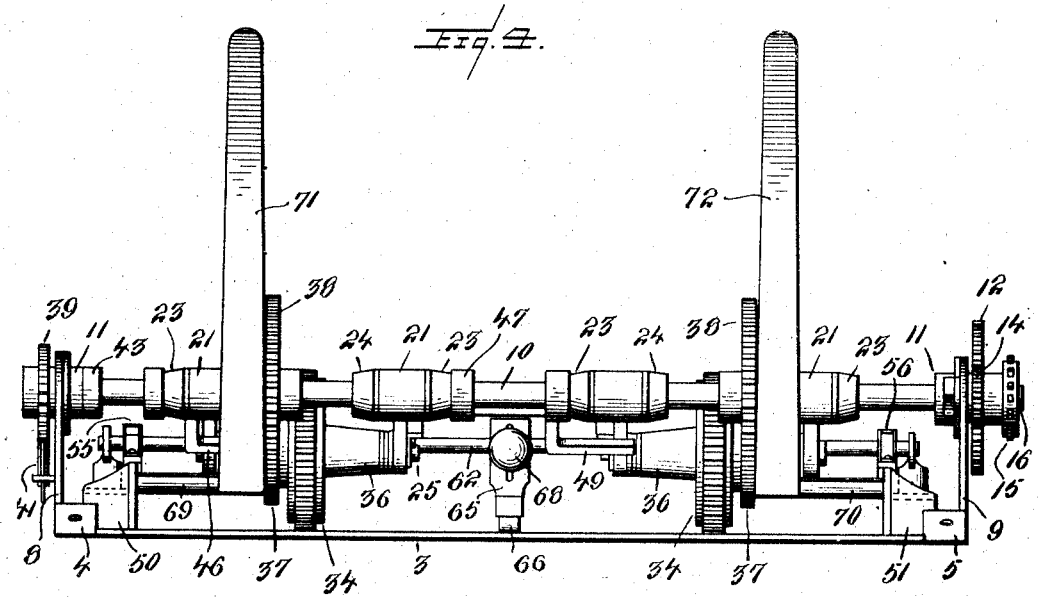
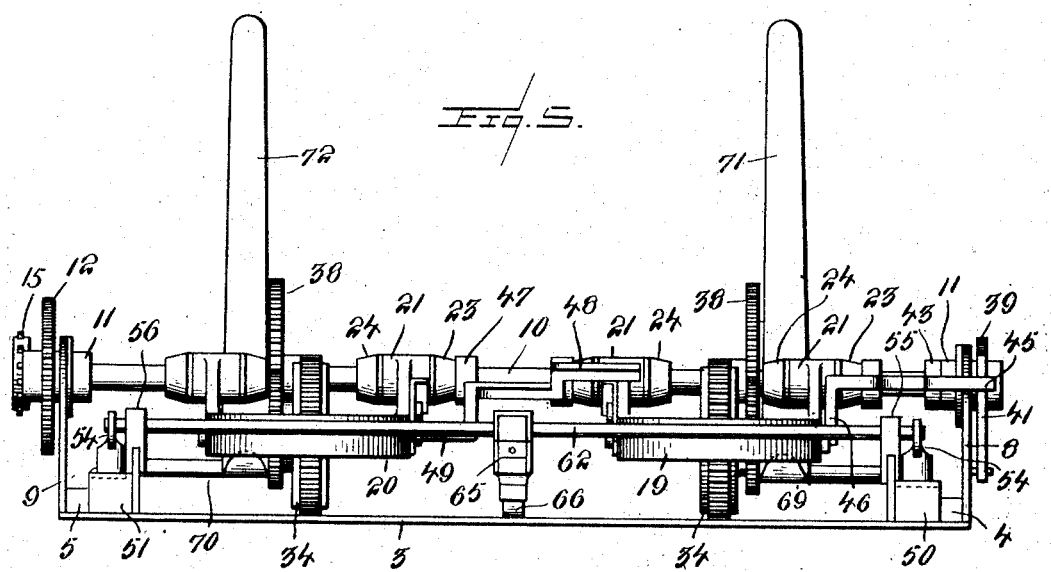

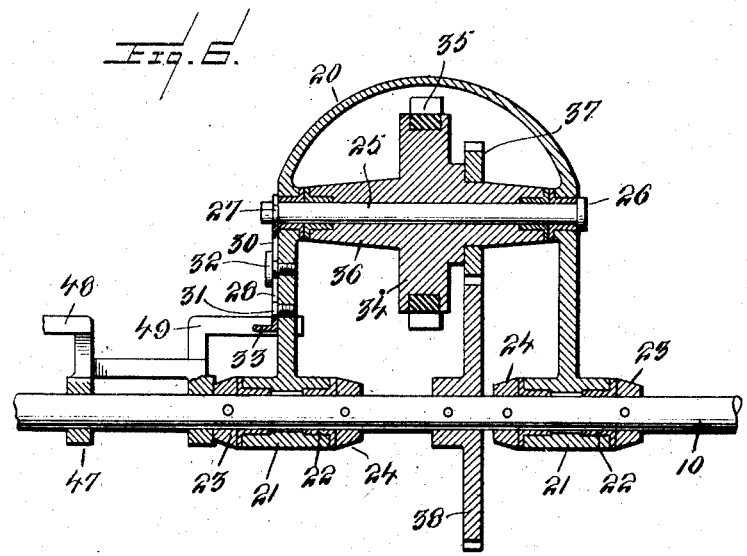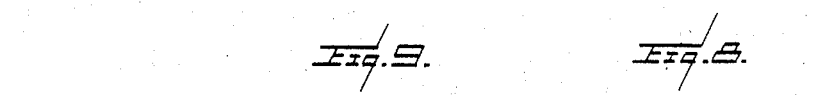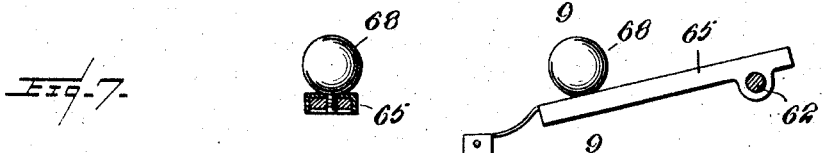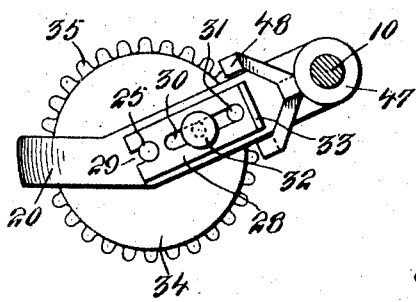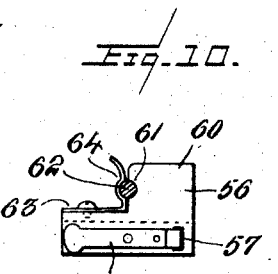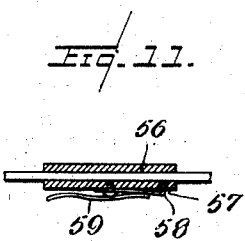

WILLIAM H. McARDLE AND ROBERT B. McARDLE, OF CAMDEN, NEW JERSEY, ASSIGNORS TO A. J. REACH, OF PHILADELPHIA, PENNSYLVANIA.

AUTOMATIC FEEDER FOR TYPE-WRITERS.

985,728.

Specification of Letters Patent. Patented Feb. 28, 1911.

Application filed February 10, 1909. Serial No. 477,161.

*To all whom it may concern:*

Be it known that we, WILLIAM H. McARDLE and ROBERT B. McARDLE, citizens of the United States, residing at Camden, in the county of Camden and State of New Jersey, have invented new and useful Improvements in Automatic Feeders for Type-Writers, of which the following is a specification.

Our invention relates to improvements in an automatic paper feeding attachment for typewriters.

The object of our invention is to provide an attachment which can be readily attached to the ordinary typewriter, and in which a series of sheets of paper or letters to be filled in with the heading or other matter to be inserted in the body of the printed forms, can be placed in a pile and a separate sheet or letter fed therefrom to the typewriter as the completed sheet or letter is removed from the typewriter in the ordinary manner, all of which is operated either by the platen of the typewriter, or independently of the platen of the typewriter by a twirler or knob fixed to the side of the attachment.

Another object of our invention is to provide an attachment of this character having certain adjustments, whereby the sheets are fed to the platen in perfect alinement, so that it is not necessary for the operator to adjust the sheets after they have entered the typewriter.

A still further object of our invention is to provide certain details of structure to accomplish the results in the most simple and effective manner.

In the accompanying drawings, in which like characters designate similar parts, Figure 1 is a top plan view of our attachment which may be applied to the bar-lock type of typewriters; Fig. 2 is a side view of our attachment looking in the direction of the arrow in Fig. 1; Fig. 3 is a side view looking in the opposite direction from Fig. 2; Fig. 4 is a front elevation; Fig. 5 is a rear elevation of our attachment; Fig. 6 is an enlarged sectional view of one of the feed rollers supporting the frames; Fig. 7 is an enlarged side elevation of one of the roller supporting frames showing the roller supporting means, and Fig. 8 is an enlarged side elevation of the upper end paper holding frame, showing the means for allowing only a single sheet of paper to be fed to the typewriter. Fig. 9 is a detail view in cross section of the arm and weight adapted to regulate the feed of paper in single sheets; Fig. 10 is a detail side view of the bearing and locking means for the shaft on which the arm shown in Fig. 9 is carried, and Fig. 11 is a detail view of the latch by which the blocks on which said shaft is carried may be adjusted longitudinally on the guide strips.

Referring now to the drawings, 1 represents a typewriter carriage which is provided with the usual platen 2 operated in the usual manner according to the make of the typewriter. The carriage of some typewriters have in the rear of the carriage two sockets in which the usual paper support is detachably secured. It is the object of our invention to so construct the same that the attachment can be readily placed and supported in the sockets intended for the paper supports now used; others have no sockets and the paper supports are permanently fixed thereon, in which case our attachment may be clamped or otherwise secured upon a bar or other convenient parts in the rear of the carriage and traveling therewith.

Our invention consists of a frame 3 of rectangular form and of sufficient size to receive any sheet of paper which can be placed in a typewriter. The lower end of said frame is provided with tongues 4 and 5 which fit on the step to which the paper support usually employed on bar-lock typewriters is secured and clamped and screwed thereon in like manner.

In order to support the rear end of the frame and thus relieve the typewriter carriage of the considerable weight of the frame and the paper carried thereon, and to permit the transverse movement of the frame with the minimum of resistance, we provide a light chain or cord 6 attached to the ring 7, and the opposite end of said cord or chain may be attached to a support at least seven feet above the frame, as the ceiling or wall of the room. The length of the cord or chain suggested is such that a very slight arc is described as the carriage of the typewriter travels back and forth, and therefore does not materially depart from the horizontal position of the frame. By this arrangement, as heretofore stated, the weight of the frame is partially removed from the typewriter carriage and swings with so slight a resistance that it does not interfere with the escapement of the carriage.

The frame 3 is supported in a horizontal position with its inner end in such a position that the sheets of paper as they leave the frame will pass to the platen and be fed to the machine the same as when fed by hand.

The frame 3, adjacent to the inner end, is provided with upwardly extending ears 8 and 9 arranged oppositely and in which is mounted the transverse shaft 10, the frame 3 carrying any desired bearing such as is indicated at 11. The shaft 10, at the right of the frame and on the outside of the ear 9, is provided with a gear wheel 12 which is keyed upon the shaft. Carried by the frame 3, adjacent to the shaft 10, is a short shaft 13, having a pinion 14 loosely mounted thereon adapted to mesh with the gear wheel 12. Carried by the pinion 14 is a sprocket wheel 15. The short shaft 13 is provided with a head 16 which prevents the sprocket wheel and pinion from sliding off of the same while its inner end is provided with a reduced portion, by means of which it is secured to the frame or ear 9.

The platen of the ordinary typewriter is provided with an operating knob 17, upon the hub of which may be secured a sprocket wheel 18, by means of which the platen may be revolved and such motion communicated to our attachment as hereinafter described. The said knob being removable, as shown, the sprocket wheel 18 can be readily attached to the platen. Said sprocket wheel being in exact alinement with the sprocket wheel 15, said wheels may be connected by an endless chain or light wire link belt 19. By this connection and the medium of the pinion 14 and the gear wheel 12, the shaft 10 is rotated with the rotation of the platen while the paper is being fed in successive sheets through the typewriter.

The sheets of paper or circulars may be placed in the frame 3 one upon the other, and any desired number of sheets may be placed therein and a regular tension maintained, thus causing a uniform feeding to the typewriter.

Intermediate of the ears 8 and 9, the shaft 10 is provided with two loosely mounted frames 19 and 20 adapted to swing to the rear of the shaft and downwardly by gravity. These frames have elongated bearing portions 21 upon the shaft 10 and are bored at their ends, as indicated at 22. The hub portions of the swinging frames at each end are provided with brass bushings 23 and 24 bearing upon the shaft, thus reducing the friction of the swinging frames. Keyed upon the shaft at each end of the hub are collars 23' and 24' holding the hubs against longitudinal movement thereon. These frames 19 and 20 are preferably made of some light material, such as aluminum, to prevent too great a pressure upon the sheets of paper.

Extending transversely through the outer ends of the frames 19 and 20 are the shafts 25, which at one end are provided with heads 26 which limit the inward movement thereof. The opposite end of each shaft is provided with a peripheral groove 27 on the outside of the frame. The outside of the frames 19 and 20 are provided with sliding plates 28, the outer end of which being provided with a slot 29 adapted to enter the peripheral groove 27 in the shaft and lock the same against inward movement. The plate 28 is also provided with an elongated slot 30 in which the pin 31 carried by the frame 20 is adapted to work and thus prevent the twisting of the plate. For the purpose of locking the plate 28 in its positions of adjustment, we provide a flat headed set screw 32 passing through the slot 31 and screwed into the frame 20. The inner end of the plate 28 is turned outwardly at 33 to form a finger hold for sliding the plate inwardly or outwardly.

Loosely mounted upon the shaft 25 is carried the roller 34 which is preferably made of wood or other light material, the outer periphery of which is provided with a tire or covering 35 of rubber having a roughened or corrugated perimeter to provide a gripping surface on the paper. The wheel 34 is provided with an elongated hub 36 which engages the side bars of the frame and prevents longitudinal movement of the wheel. The hub is provided with a gear wheel 37 rigidly attached to the hub and meshing with the gear wheel 38 keyed upon the shaft 10. The shaft 10 may be rotated in the direction of the arrow in Fig. 3 and through the gears 37 and 38, the roller 34 is rotated in the opposite direction of the shaft, thus causing the proper feed of the paper to the machine.

The shaft 10, on the outside of the ear 8, is provided with a ratchet wheel 39 keyed upon the shaft. Pivotally mounted upon the ear 8 at 40 is a double toothed pawl 41. Below the pawl is a spring 42 for normally holding the pawl in engagement with the ratchet wheel 39. During the normal operation or rotation of the shaft 10, the ratchet wheel rotates in the direction of the arrow, Fig. 3, and the position of the pawl is such as to allow it to ride freely over the ratchet wheel. This arrangement is intended to lift the swinging frame when the shaft 10 is rotated in an opposite direction from that indicated. This backward rotation of the shaft 10 is caused by the backward rotation of the platen of the typewriter such as is often done in moving the paper backward for corrections, and by thus raising the swinging frames, the rollers are lifted from the paper and the backward feeding of the paper prevented, or the rollers locking against the paper or the frame underneath.

Such raising of the rollers is accomplished in the following manner: the pawl 41 is normally held in but slight engagement with the teeth of the ratchet wheel 39, so that the wheel rotating in the direction indicated rocks the pawl slightly and passes over the back of the teeth of the pawl. When the wheel 39 is rotated in the opposite direction for the purpose described, the teeth thereon successively engage the teeth on the pawl 41, and mesh sufficiently to raise the pawl to a substantially horizontal position. This action never gets beyond a partial meshing so that when the wheel in revolving passes the point where its engaged tooth can sustain the teeth on the pawl, the pawl is successively engaged by the next tooth on the wheel, there being too much mesh to disengage entirely and insufficient to lock the parts. When the rotation of the wheel is reversed, the pawl and rollers drop into normal position indicated in the drawings.

The shaft 10, on the inside of the ear 8, has a hub 43 which is loosely mounted upon the shaft and carrying a rearwardly extending arm 44 having an outwardly turned end 45 extending over the free end of the pawl 41. The hub 43 carries an arm 46 extending under the roller-carrying frame 19. The shaft 10 intermediate of the frames 19 and 20 is provided with a hub 47 loosely mounted thereon and carrying an arm 48 extending to the left over the roller-carrying frame 19. The hub 47 has a second arm 49 extending to the right under the frame 20 and by the arrangement of these arms, it will be seen that the raising of the frame 19 will carry with it the frame 20.

The construction just described allows the platen to be turned backward freely as the feed rollers are lifted clear of contact with and cannot impinge or clench against the paper-supporting frame. The backward rotation of the platen will cause the shaft 10 to rotate to the left in Fig. 3 and the ratchet teeth of the ratchet wheel will engage the teeth of the pawl 41 which in turn moves the arm 45 upwardly carrying with it the frames 19 and 20 and lifting the feed rollers from engagement with the paper on the frame.

The frame 3 adjacent to the sides is provided with longitudinally extending guide strips 50 and 51 which extend the entire length of the frame and which are for the purpose of guiding the paper to the platen of the typewriter. In order to adjust the guide strips in and out for different widths of paper, we provide lateral slots in the frame 3 through which the thumb screws 54 pass, and by means of which the guides are held in their adjusted position. The guide strips adjacent to their rear ends have the blocks 55 and 56 slidably mounted thereon which straddle the guide plates and are held thereon by gravity. In order to prevent these blocks from sliding on the guide plates against longitudinal movement, we provide the sides of the blocks with openings 57 through which extend the laterally turned ends 58 of the intermediately pivoted spring member 59, whereby the laterally turned end 58 normally engages the guide plate and holds itself in its adjusted position, and to move the blocks the spring may be lifted by the small thumb lever. The said blocks 55 and 56 are provided with upwardly extending portions 60, the vertical walls of which are provided with semi-circular grooves 61 in which rests the shaft 62. For the purpose of holding the shaft 62 in the groove 61, we provide springs 63 having depressed portions 64 arranged opposite the grooves 61 and receiving the shaft 62. This allows the shaft 62 to be readily removed or inserted in the blocks. The said shaft has an arm 65 loosely mounted thereon which carries at its lower end a rubber block 66 which engages the paper on the frame and by gravity prevents but a single sheet from passing from the frame at a time. The arm 65 is provided with an elongated slot in which a weight 68 is adjustably held, whereby the pressure of the arm 65 is regulated by moving the weight longitudinally upon the arm. The modification of the pressure of this arm has been found necessary in adapting it in the use of different grades and thickness of paper.

The front end of the frame is provided with horizontal guides 69 and 70 which are carried by the longitudinal guide strips 50 and 51 and which are adapted to engage the paper and insure its being fed down to the platen.

In order to prevent the sheets of paper, as they pass from the platen, falling upon the paper feeding mechanism, we provide the two upwardly extending curved arms 71 and 72 secured to the guide strips 69 and 70 upon which the paper rests.

In some instances it has been found desirable to operate the shaft 10 directly by hand, and for that purpose the opposite end of the shaft to that carrying the sprocket wheel is provided with an operating knob or wheel 73.

The construction and operation of our invention will be readily understood from the foregoing description and by reference to the accompanying drawings, and it will be appreciated that the parts and combinations thereof may be varied within a wide range from the specific exemplification thereof shown without departing from the spirit and scope of our invention.

Having thus fully described our invention, what we claim as new and desire to secure by Letters Patent, is—

1. The combination with a typewriter, of a paper supporting frame supported by the carriage thereof, a transverse shaft carried by the frame adjacent the carriage, swinging frames carried by the shaft, paper feeding rollers carried by the swinging frames and geared to the shaft, and means connected to the platen of the carriage for rotating the said shaft.

2. The combination with a typewriter, of a frame supported thereby, a transverse shaft rotatably mounted in the frame adjacent the carriage, swinging frames carried by the shaft, paper feeding rollers carried by the swinging frames and geared to the shaft, means connected to the platen of the carriage for rotating the said shaft, and means for swinging the frames upwardly for disengaging the feed rollers from the paper on the frame.

3. The combination with a typewriter, of a frame supported thereby, a transverse shaft rotatably mounted in the frame adjacent the carriage, swinging frames carried by the shaft, paper feeding rollers mounted in the frames, gears carried by the rollers, gears carried by the shaft and meshing with the roller gears, means operated by the platen for rotating the shaft, and means for swinging the frames upwardly for disengaging the feed rollers from the paper on the frame.

4. The combination with a typewriter, of a paper supporting frame removably attached to the carriage of a typewriter, a shaft rotatably mounted in the frame, paper feeding rollers carried by the shaft and driven thereby, means at one end of the shaft for driving it through the medium of the platen, and a pawl and ratchet mechanism for raising the rollers upon the backward movement of the shaft.

5. The combination with a typewriter, of a paper supporting frame removably carried by the carriage of the typewriter, rotary paper feeding rollers swingingly supported by the frame and held upon the paper therein by gravity, means operated by the platen for rotating the said rollers, transversely adjustable plates carried by the frame for different widths of paper, a transverse bar longitudinally adjustable on the plate, a swinging arm adapted to rest upon the paper to allow but a single sheet of paper to pass from the frame, and a weight adjustably carried by the arm for varying the tension of the arm on the paper.

6. The combination with a typewriter, of a paper supporting frame removably attached to the carriage of the typewriter, upwardly extending ears carried by the sides of the frame, a shaft rotatably mounted in the said ears, swinging frames supported by the shaft intermediate the ears, paper feeding rollers rotatably mounted in the free ends of the frames and geared to the shaft, means operated by the platen for rotating the shaft, means operated by the backward movement of the shaft for swinging the frame upwardly and lifting the feed rollers from the paper to prevent the backward feed of the paper when the platen is turned backward, and guide plates for guiding the paper to the platen in an exact alinement, substantially as described.

7. The combination with a typewriter, of a paper supporting frame removably attached to the carriage of the typewriter, upwardly extending ears carried by the side of the frame, a shaft rotatably mounted in said ears, swinging frames supported by the shaft intermediate the ears, paper feeding rollers rotatably mounted in the free end of the frames and geared to the shaft, a chain driven by the platen for rotating the shaft, a pawl and ratchet connected to the shaft for swinging the frames upwardly upon the backward movement of the shaft, and guide plates adapted to be adjusted to or from each other for guiding the paper to the platen in an exact alinement, substantially as described.

8. The combination with a typewriter, of a paper supporting frame carried by the typewriter, a shaft rotatably mounted in the frame, means operated by the platen of the typewriter for rotating the shaft, swinging frames carried by the shaft, feed rollers carried by the frames and geared to the shaft, a pawl and ratchet mechanism for raising one of said frames upon the backward movement of the shaft, and a loose connection between the frames, whereby the raising of one frame raises the other and the lowering of one allows the other to lower by gravity.

9. The combination with a typewriter, of a paper supporting frame carried by the carriage of the typewriter, a shaft rotatably mounted in the frame, swinging frames carried by the shaft, feed rollers mounted in the frames and geared to the shaft, a gear carried by one end of the shaft and operated by the platen of the typewriter, a ratchet wheel carried by the opposite end of the shaft, a two-toothed pawl intermediately pivoted to the frame and normally held in engagement with the ratchet wheel, a hub mounted upon the shaft and having an outwardly extending arm passing over the pawl, the said hub having an inwardly extending arm passing under the frame and adapted to swing the same upwardly.

10. The combination with a typewriter, of a paper supporting frame carried by the carriage of the typewriter, a rotary shaft supported by the frame, swing-frames carried by the shaft, feed rollers carried by the frames and geared to the shaft, a gear carried by one end of the shaft, means connected to the platen for rotating said gear, a ratchet wheel carried by the opposite end of the shaft, a double toothed pawl intermediately pivoted to the frame and normally spring held in engagement with the ratchet wheel, a hub loosely mounted upon the shaft and having an arm extending over the free end of the pawl, a second arm carried by the hub and extending under the swinging arm 20, a second hub loosely mounted upon the shaft between the swinging frames 19 and 20, an arm carried by the hub and extending over the frame 19, and a second arm carried by the hub and extending under the frame 20, substantially as described.

11. The combination with a typewriter of a paper supporting frame carried by the carriage of the typewriter, a swinging U-shaped frame carried by the paper frame, a shaft mounted in said frame and having a head at one end and a peripheral groove at the opposite end, a sliding plate carried by the U-shaped frame and having a notched end to enter the peripheral groove, said plate having an elongated slot through which a pin carried by the frame passes, a set screw passing through the slot and screwed into the U-shaped frame for holding the plate in its adjusted position and the inner end of the plate turned outwardly to form a finger hold for operating the same.

12. The combination with a typewriter, of a paper supporting frame carried thereby, means carried by the frame for feeding the paper to the platen of the typewriter, longitudinally extending guide plates carried by the frame, means for adjusting the plates transversely of the paper frame, and paper holding means longitudinally adjustable upon said guide plates.

13. The combination with a typewriter, of a paper supporting frame carried thereby, means carried by the frame for feeding the paper to the platen of the typewriter, longitudinally extending guide plates carried by the frame, means for adjusting the plates transversely of the paper frame, blocks straddling the guide plates and longitudinally adjustable thereon, spring catches for locking the blocks on the guide plates, semi-circular grooves carried by the blocks, springs having semi-circular depressions corresponding with the grooves, a shaft adapted to be sprung between the springs and blocks into the grooves, an arm loosely mounted upon the shaft and a longitudinal slot therein, a weight longitudinally adjustable in said slot whereby the tension of said arm on the paper in the frame is varied, horizontal plates carried by the guide plates between the paper feeding mechanism and the platen, and upwardly extending curved paper supporting arms for supporting the sheets of paper as they pass from the platen.

14. The combination with a typewriter of a paper holding frame supported by the carriage thereof and adapted to receive sheets of paper lying horizontally one upon another, rotary paper feeding rollers supported by the frame, means connected to the platen of the carriage for operating the paper feeding rollers supported by the frame, means connected to the platen of the carriage for operating the paper feeding rollers, and automatic means for raising the paper feeding rollers from the paper within the frame, and laterally adjustable means for guiding the sheets in correct position to the typewriter.

15. The combination with a typewriter, of a substantially horizontal paper supporting frame supported by the carriage thereof, a transverse shaft carried by the frame adjacent to the carriage, swinging frames carried by the shaft, paper feeding rollers carried by the swinging frame and geared to the shaft, and laterally adjustable means carried by the paper supporting frame for accommodating sheets of different widths and guiding them in correct position and alinement to the typewriter.

16. The combination with a typewriter, of a frame supported thereby, a transverse shaft rotatably mounted in the frame adjacent the carriage, swinging frames carried by the shaft, paper feeding rollers carried by the swinging frames and geared to the shaft, means connected to the platen of the carriage for rotating the said shaft, and means for swinging the frames upwardly for disengaging the feed rollers from the paper on the frame, and laterally adjustable side guides carried by the frame for accommodating sheets of different widths and guiding them in correct alinement and position to the typewriter.

17. The combination with a typewriter, of a frame supported by the carriage thereof, a transverse rotatable shaft carried by the frame adjacent the carriage, swinging frames carried by the shaft, feed rollers carried by the frames and geared to the shaft, a gear carried by one end of the shaft, means connected to the platen of the typwriter for rotating the said gear, and a ratchet carried by the opposite end of the shaft for moving the frames upwardly to lift the rollers from the paper within the frame, and laterally adjustable side guides carried by the paper supporting frame for accommodating sheets of different widths and guiding them in correct position and alinement to the platen of the typewriter.

18. The combination with a typewriter, of a paper supporting frame removably carried by the carriage of the typewriter, rotary paper feeding rollers swingingly supported by the frame and held upon the paper therein by gravity, means operated by the platen for rotating the said feeding rollers, transversely and laterally adjustable guide plates carried by the frame to accommodate different widths of paper, a transverse bar longitudinally adjustable on the plates, a swinging arm adapted to rest upon the paper to allow but a single sheet of paper to pass from the frame at a time, and a weight adjustably carried by the arm for varying the tension of the arm on the paper.

19. The combination with a typewriter, of a paper supporting frame removably attached to and only partially supported by the carriage of the typewriter, upwardly extending ears carried by the sides of the frame, a shaft rotatably mounted in the said ears, swinging frames supported by the shaft intermediate the ears, paper feeding rollers rotatably mounted in the free ends of the frames and geared to the shaft, means operated by the platen for rotating the shaft, means operated by the backward movement of the shaft for swinging the frames upwardly and lifting the feed rollers from off the paper when the platen is turned backward, and guide plates for guiding the paper to the platen in correct position or alinement, substantially as described.

20. The combination with a typewriter, of a paper supporting frame supported by the carriage of the typewriter, a shaft rotatably mounted in the frame, swinging U-shaped frames carried by the shaft, feed rollers mounted in the free ends of the frames, gears carried by the feed rollers, gears keyed upon the shaft and meshing with the roller gears, and means operated by the platen of the typewriter for rotating the shaft.

21. The combination with a typewriter, of a paper supporting frame carried by the carriage of the typewriter, a shaft rotatably mounted in the frame, swinging U-shaped frames carried by the shaft, feed rollers mounted in the ends of the frames, gears carried by the feed rollers, gears keyed upon the shaft and meshing with the roller gears, means operated by the platen of the typewriter for rotating the shaft, and laterally adjustable side guides carried by the paper supporting frame for accommodating sheets of different widths and causing them to be fed to the platen of the typewriter in correct position or alinement.

22. The combination with a typewriter, of a paper supporting frame carried by the carriage of the typewriter, a shaft mounted in the frame, swinging frames carried by the shaft, feed rollers carried by the frames and geared to the shaft, one end of the shaft rotatably connected to the platen of the typewriter, a ratchet wheel carried by the opposite end of the shaft, a pawl intermediately pivoted on the frame and adapted to be rocked by the ratchet wheel upon the backward movement of the shaft and means operated by the said pawl for swinging the frames upwardly.

23. In a paper feeding attachment for typewriters, the combination of a paper supporting frame, a transverse rotatable shaft carried by the frame, freely swinging members carried pivotally on the shaft and swinging away from the discharging end of the attachment, wheel-shaped feed rollers having corrugated rubber peripheries mounted in the free ends of the swinging-members and receiving their motion from the shaft, means for rotating the shaft, and means for accommodating sheets of different widths and guiding them in correct position to the platen of the typewriter.

24. In a paper feeding attachment for typewriters, the combination of a paper supporting frame, a transverse rotatable shaft carried by the frame, freely swinging members carried pivotally on the shaft, feed rollers rotatably carried by the free ends of the swinging members and receiving their motion from the shaft, means for rotating the shaft, and means for accommodating sheets of different widths and guiding them in correct position or alinement to the typewriter platen.

In testimony whereof, we have hereunto signed our names to this specification in the presence of two subscribing witnesses.

WILLIAM H. McARDLE.
ROBERT B. McARDLE.

Witnesses:
ALBERT E. HEAL,
WM. V. FISLER.

---

Copies of this patent may be obtained for five cents each, by addressing the "Commissioner of Patents, Washington, D. C."